(12) United States Patent
Schmid et al.

(10) Patent No.: US 11,598,469 B2
(45) Date of Patent: Mar. 7, 2023

(54) LENGTH COMPENSATOR

(71) Applicant: Georg Fischer Rohrleitungssysteme AG, Schaffhausen (CH)

(72) Inventors: Lenz Schmid, Jestetten (DE); Jürgen Rösch, Lenzkirch (DE); Robert Reiz, Stühlingen (DE); Markus Breyer, Radolfzell (DE)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 204 days.

(21) Appl. No.: 16/710,749

(22) Filed: Dec. 11, 2019

(65) Prior Publication Data
US 2020/0191304 A1 Jun. 18, 2020

(30) Foreign Application Priority Data

Dec. 13, 2018 (EP) .................................... 18212137
Mar. 19, 2019 (EP) .................................... 19163711

(51) Int. Cl.
*F16L 51/00* (2006.01)

(52) U.S. Cl.
CPC .................................... *F16L 51/00* (2013.01)

(58) Field of Classification Search
CPC ......... F16L 51/00; F16L 51/022; F16L 51/02; F16L 51/024; F16L 51/025; F16L 51/027; F16L 27/113
USPC ....................................................... 285/224
See application file for complete search history.

(56) References Cited

U.S. PATENT DOCUMENTS

| | | | | |
|---|---|---|---|---|
| 4,225,143 | A * | 9/1980 | Hannah | ................... F16L 51/00 |
| 4,268,072 | A * | 5/1981 | Straub | ..................... F16L 51/00 |
| 9,255,641 | B2 | 2/2016 | Raible et al. | |
| 10,035,194 | B2 | 7/2018 | Hunnekuhl et al. | |
| 2015/0013948 | A1* | 1/2015 | Barnes | .................... F16L 51/00 |
| 2015/0273756 | A1 | 10/2015 | Conrad | |
| 2017/0045172 | A1* | 2/2017 | Harless | .................. F16L 51/00 |
| 2017/0191597 | A1* | 7/2017 | Conrad | ................... F16L 51/02 |
| 2019/0105792 | A1 | 4/2019 | Breyer | |
| 2019/0308277 | A1 | 10/2019 | Reiz | |
| 2019/0309887 | A1 | 10/2019 | Reiz et al. | |

FOREIGN PATENT DOCUMENTS

| | | |
|---|---|---|
| DE | 7325208 | 10/1973 |
| DE | 2542644 A1 | 4/1976 |
| DE | 102007043944 A1 | 3/2009 |
| GB | 1246055 | 9/1971 |
| GB | 1499048 A | 1/1978 |

* cited by examiner

*Primary Examiner* — Zachary T Dragicevich
(74) *Attorney, Agent, or Firm* — Harness, Dickey & Pierce, P.L.C.

(57) ABSTRACT

A length compensator for pipelines, preferably plastic pipelines, containing two connecting components, preferably made from plastic, a compensating element made from an elastic material, preferably a thermoplastic elastomer (TPE), and a supporting pipe, wherein the compensating element is arranged between the two connecting components and the compensating element ends are connected to the connecting components, wherein the outer lateral surface of the compensating element is suitably encompassed by the inner lateral surface of the supporting pipe around its entire circumference, wherein the supporting pipe has a circular cross-sectional area and the compensating element expands and contracts exclusively in the axial direction.

13 Claims, 3 Drawing Sheets

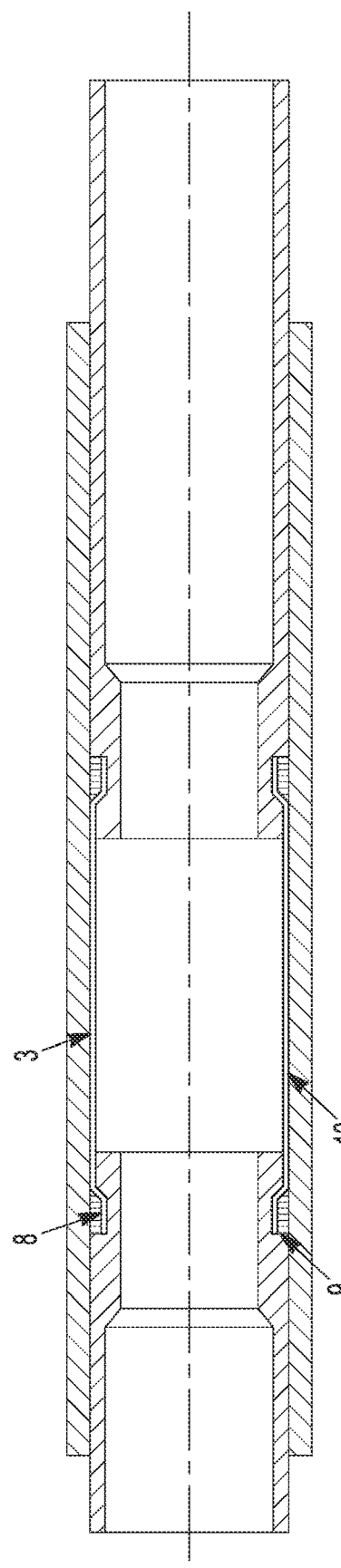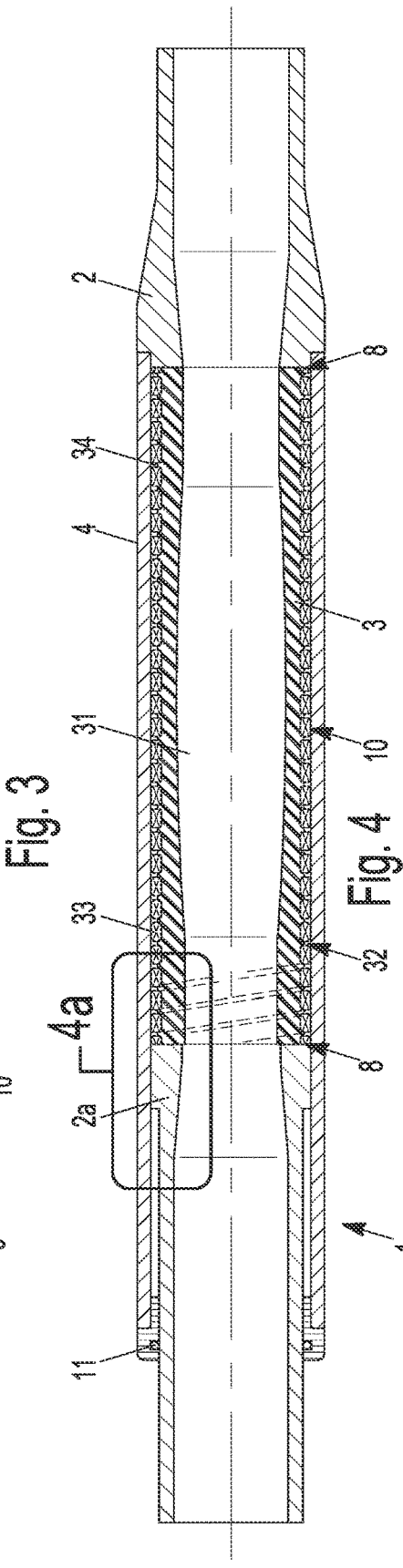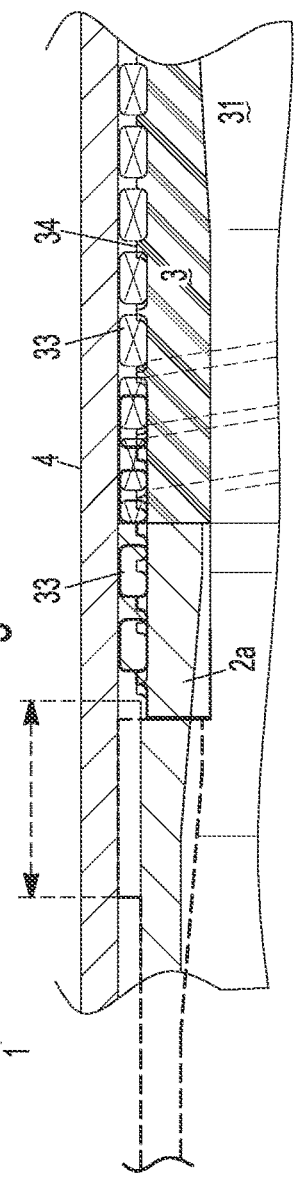
Fig. 3
Fig. 4
Fig. 4a

LENGTH COMPENSATOR

CROSS-REFERENCE TO RELATED APPLICATIONS

This application claims the benefit and priority of European Patent Application Nos. 18 212 137.6 filed Dec. 13, 2018 and 19 163 711.5 filed Mar. 19, 2019.

FIELD OF THE INVENTION

The invention relates to a length compensator—and the compensating element thereof—for pipelines, preferably plastic pipelines, containing two connecting components, preferably made from plastic, a compensating element made from an elastic material, preferably a thermoplastic elastomer (TPE), and a supporting pipe, wherein the compensating element is arranged between the two connecting components and the compensating element ends are connected to the connecting components.

BACKGROUND OF THE INVENTION

Length compensators serve for accommodating or compensating the change in length of an installed pipeline, which is caused, for example, by temperature changes or external influences such as forces caused by earthquakes, pump strokes etc. The length of a pipeline changes depending on the temperature, be this as a result of the external temperature or the medium temperature of the medium transported in the pipeline. This change in length, be it an expansion or a contraction, needs to be accommodated. From the prior art, for example, pipe loops are known which permit or accommodate a certain change in length due to their deflections of the pipeline. Bellows or rubber sleeves are furthermore also known from the prior art, as are pipes which are axially displaceable inside one another.

The German utility model 7325208 discloses an expansion compensator for pipelines, wherein the expansion body is arranged in a housing which has an oval cross-sectional shape in which the expansion body can accordingly also move horizontally.

The solutions described above are disadvantageous in that they require a large amount of space, have only a small compensation distance and/or do not permit a high internal pressure or do not permit the same internal pressure as the pipeline itself.

SUMMARY OF THE INVENTION

An aspect of the invention is to propose a length compensator for pipelines, which permits a long compensation distance and withstands the same internal pressure as the pipeline itself. Moreover, the outer lateral surface of the compensating element is intended to have a low frictional resistance so that the length of the length compensator is able to change easily.

This aspect is achieved according to the invention in that the outer lateral surface of the compensating element is suitably encompassed by the inner lateral surface of the supporting pipe around its entire circumference, wherein the supporting pipe has a circular cross-sectional area and the compensating element expands and contracts exclusively in the axial direction.

The circular cross-sectional area of the supporting pipe preferably extends over the full length of the supporting pipe, wherein the cross-sectional area is preferably constant over the entire length.

This aspect is also achieved according to the invention in that the compensating element has a cylindrical hollow body made from plastic and a helical element, preferably made from plastic, is arranged on the outer lateral surface of the cylindrical hollow body.

The length compensator according to the invention for pipelines, preferably plastic pipelines, contains two connecting components, preferably made from plastic. The connecting components are aligned coaxially to one another and preferably have the same internal and external diameter. The length compensator furthermore has a compensating element made from an elastic material, preferably a thermoplastic elastomer (TPE), wherein the compensating element can be formed by a simple elastic tube or a pipe as well as by a specifically developed element which accommodates the change in length of a pipeline. The length compensator likewise has a supporting pipe in which the compensating element is arranged. The compensating element is arranged between the two connecting components. The compensating element made from an elastic material can preferably also consist of different materials, for example a plurality of different layers, preferably different plastics or coatings on the inside and/or outside. The compensating element or the compensating element ends are connected to the connecting components. The outer lateral surface of the compensating element is suitably encompassed by the inner lateral surface of the supporting pipe around its entire circumference, that is to say that the compensating element is preferably arranged concentrically in the supporting pipe. As a result of this arrangement and design of the compensating element and the supporting pipe, the compensating element can expand and contract exclusively in the axial direction. As a result of the supporting pipe surrounding the compensating element or the circumference thereof, the internal pressure is absorbed by the supporting pipe and the compensating element is not overstressed since it is supported by the supporting pipe. The connecting components are preferably also at least partially encompassed by the supporting pipe or arranged in the supporting pipe; this serves for guiding the connecting components. It is advantageous if the connecting components are also arranged concentrically in or on the supporting pipe.

A connecting component is preferably fixed axially on or to the supporting pipe, whereby the change in length is established by the displacement of the other connecting component and the contraction or expansion of the compensating element.

The connecting components are preferably produced from polyethylene (PE), although polypropylene (PP), polybutene (PB), polyvinylidene fluoride (PVDF), polyvinyl chloride (PVC), acrylonitrile butadiene styrene (ABS) or ethylene chlorotrifluoroethylene (ECTFE) and other typical pipeline materials made from plastic can be also used.

The connecting components are preferably connected to the respective compensating element end by means of a material-fitting connection, preferably by means of butt welding, especially preferably by WNF welding, sleeve welding, electric sleeve welding or a bonded connection, wherein welding can be carried out by means of contact welding as well as a contactless welding method, preferably IR welding. Of course, all established and known welding methods can be used for connecting the compensating element ends to the connecting components.

It is advantageous if the respective end face of the connecting components is connected to the respective compensating element end. This enables a simple, stable and, especially, sealed connection between the compensating element and the connecting component.

As a further configuration of the invention, it is possible for the connecting components to be connected to the respective compensating element end by means of a form-fitting and/or force-fitting connection. These can be clamping connections, in which the compensating element end is clamped or wedged in the connecting components, or other options for fastening the compensating element ends.

A further possible configuration of the invention consists in that the connecting components and the compensating element are connected to one another in a two-component injection moulding process and a respective connecting component is integrally formed on the compensating element ends by means of plastic injection moulding. This ensures economical production of the length compensator according to the invention as well as the leak-tightness between the compensating element and the connecting components.

The compensating element preferably has the same internal diameter as the connecting components. This ensures a lower flow resistance at the internal diameter, which is favourable for the medium and for minimising impurities which collect at protruding edges and corners.

According to a preferred embodiment, the length compensator according to the invention has a friction-reducing layer; the friction-reducing layer is preferably arranged on the outer lateral surface of the compensating element. This ensures a low resistance, whereby the change in length of the pipeline in the length compensator can be easily established or accommodated there. Moreover, it is thus ensured that the length compensator represents the lowest resistance in the pipeline and the change in position is compensated there so that the pipeline does not bend or otherwise shift in an unwanted manner.

It is moreover advantageous if the connecting components also have a friction-reducing layer on their outer lateral surface, analogously to the layers which are applied to the supporting pipe or compensating element.

The supporting pipe is preferably produced from a plastic, especially preferably POM, PE-UHMW, PTFE, $MoS_2$, polyethylene (PE), polypropylene (PP), polybutene (PB), polyvinylidene fluoride (PVDF), polyvinyl chloride (PVC), acrylonitrile butadiene styrene (ABS) or ethylene chlorotrifluoroethylene (ECTFE). These plastics have good dry lubrication properties.

It has proven advantageous if the friction-reducing layer is formed by grease or oil, in particular PTFE or silicone. This can be applied quickly and easily to the length compensator or to the corresponding lateral surface and significantly lowers the frictional resistance between the compensating element and the supporting pipe.

As an alternative configuration, it has proven effective if the friction-reducing layer is formed by dry lubrication, in particular a coating of the inner lateral surface of the supporting pipe is preferably formed by an anti-friction coating or a metal coating. This enables maintenance-free use of the length compensator.

A preferred embodiment of the length compensator according to the invention consists in that the friction-reducing layer is formed by rings or a fabric, wherein the friction-reducing layer forms the outer lateral surface of the compensating element. It is advantageous if the rings or fabric are arranged coaxially to the compensating element as well as to the supporting pipe and lie suitably between the compensating element and the supporting pipe.

The length compensator according to the invention preferably has a stop element, wherein the stop element is arranged at an end of the supporting pipe. The stop element serves such that the length compensator or the compensating element is not over-expanded and only a maximum expansion is permitted. Although the compensating element is tightly connected to the connecting components, the stop element preferably has a seal which again ensures the leak-tightness of the length compensator and protects against dirt entering from the outside.

As a further possible configuration, it has proven effective if the supporting pipe is encompassed by an insulation layer. This is especially advantageous in insulated or pre-insulated pipeline systems in that the length compensator installed in the pipeline also has an insulation layer and does not have to be insulated separately. Since the supporting pipe does not change and the compensation occurs in the interior of the supporting pipe, an insulation layer can be applied to the outer circumference of the supporting pipe, or other layers, coverings or fastenings can be provided.

The compensating element according to the invention for a length compensator has a cylindrical hollow body made from plastic, wherein a helical element, preferably made from plastic, is arranged on the outer lateral surface of the cylindrical hollow body. The plastics which can be used here correspond to the plastics already mentioned. The helical element forms the friction-reducing layer in order to inhibit the change in length as little as possible between the compensating element and the supporting pipe. Of course, the helical element can likewise comprise dry lubrication, grease or oil, although this isn't compulsory. It is equally possible to combine the features and properties described in relation to the length compensator with this compensating element instead of the examples described above.

In an advantageous embodiment, the inner cylindrical hollow body has a wall-thickening increase in the direction of the two end faces. This serves such that the stresses exerted on the hollow body as a result of the tension are reduced in the region of the attachment to the connecting components owing to the wider contact surface or improved stress distribution.

It is advantageous if the cylindrical hollow body has a profile, preferably a helically extending web, on its outer lateral surface.

It is likewise advantageous if the helical element extends inside the profile of the cylindrical hollow body. As a result, the helical element is guided and is only arranged between the webs, which allows a constant change in length of the compensating element.

The helical element is preferably connected with form fit to the inner cylindrical hollow body, wherein a material fit between the helical element and the cylindrical hollow body is also conceivable.

The method according to the invention for producing the compensating element includes injection moulding a cylindrical hollow body and a helical element, wherein the hollow body and the helical element are produced in a two-component injection moulding method or injection moulded separately and the helical element is subsequently screwed to the cylindrical hollow body.

All possible configurations can be freely combined with one another. The method features can also be feely combined with the features of the devices.

BRIEF DESCRIPTION OF THE DRAWINGS

Exemplary embodiments of the invention are described with reference to the figures, wherein the invention is not restricted only to the exemplary embodiments. The figures show:

FIG. 3 shows a longitudinal section through a length compensator according to the invention, with a form- and force-fitting connection between the compensating element and the connecting components, FIG. 4 shows a longitudinal section through a length compensator according to the invention, with a compensating element according to the invention, FIG. 4a is an enlarged view of a portion of FIG. 4 showing contraction of the compensating element;

DETAILED DESCRIPTION OF THE PREFERRED EMBODIMENT

Figure 1:
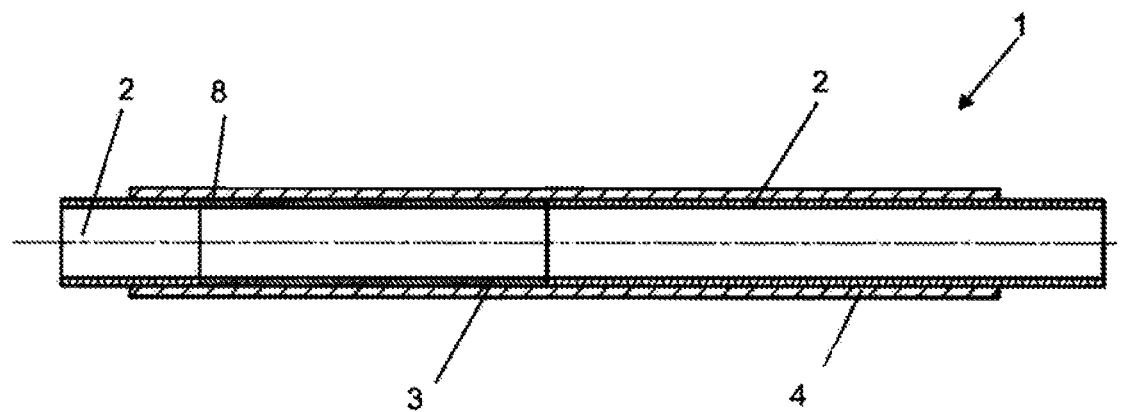
FIG. 1 shows a longitudinal section through a length compensator according to the invention, with a material-fitting connection at the end faces of the connecting components.

The drawing illustrated in FIG. 1 shows a length compensator 1 according to the invention in a possible embodiment in longitudinal section. The length compensator 1 serves for accommodating or compensating the change in length of a pipeline, which is caused, for example, by changes in temperature. The length compensator 1 has two connecting components 2, which are fastened between the mutually opposing free ends of a pipeline. The two mutually opposing end faces of the connecting components 2 in the supporting pipe 4 are connected to one another by means of a compensating element 3 at the compensating element ends 8, wherein alternative connection options are also conceivable. The connections are preferably inseparable and are produced, for example, by a material fit, such as welding or by means of an injection moulding method, which ensures that the connection is tight.

For example, the compensating element ends 8 are overmoulded and the connecting components 2 are formed by means of a two-component injection moulding process, with other connection types also being conceivable, such as form- and/or force-fitting connections, as illustrated in FIG. 3. The compensating element 3 is surrounded by the supporting pipe 4, and the connecting components 2 are also at least partially surrounded by the supporting pipe 4. As a result of the compensating element 3 being suitably surrounded by the supporting pipe 4, this serves for the support thereof and absorbs the internal pressure which is generated by the medium. Owing to the surrounding supporting pipe 4, the compensating element 3 is unable to expand radially. The compensating element 3 expands and contracts only in the axial direction, whereby the change in length of the pipeline is compensated and the length compensator 1 also still withstands the required internal pressure according to the pipeline specification.

Figure 2:
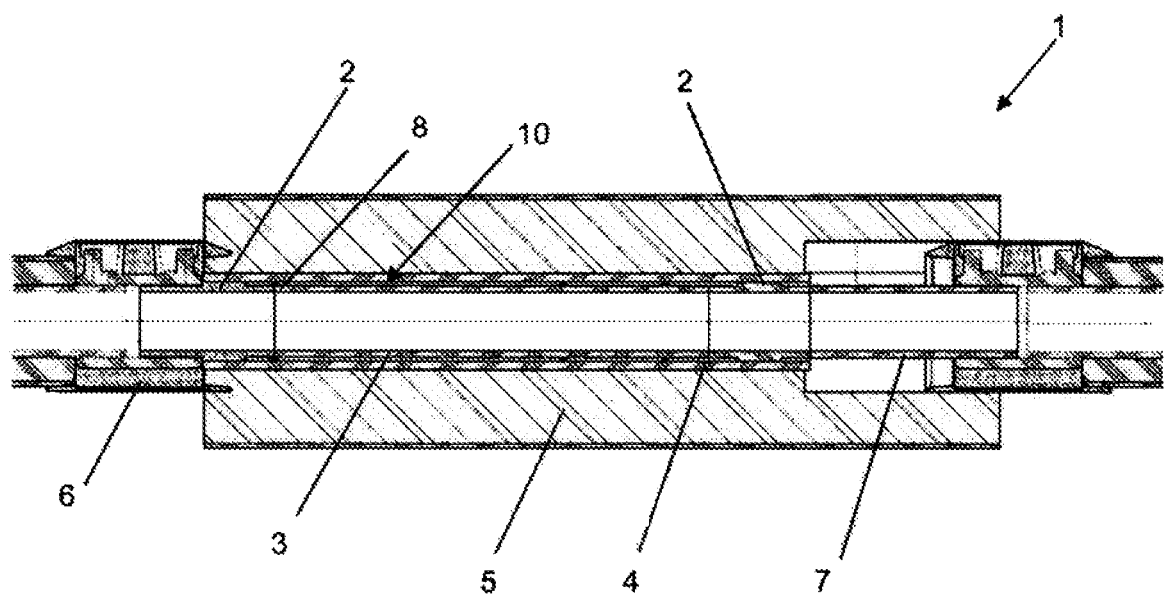
FIG. 2 shows a longitudinal section through a length compensator according to the invention, with an insulation layer.

As a further embodiment, FIG. 2 shows an insulated length compensator 1. It is in turn clearly shown here that the supporting pipe 4 suitably encompasses the compensating element 3 and both an expansion and a contraction are only possible in the axial direction. In this illustrated embodiment, an insulation layer 5 is arranged on the outer circumference of the supporting pipe 4. This possible configuration is applied to insulated pipeline systems and, in addition to the length compensation of the pipeline system, ensures rapid installation without having to subsequently apply separate insulation to the length compensator.

Moreover, a possible connection of the length compensator 1 or the connecting components 2 to the pipeline is shown in FIG. 2, wherein this can also be implemented for length compensators without an insulation layer. As an example, a coupling 6 is attached directly to a connecting component 2, wherein this coupling is formed as an electric welding sleeve here, although other couplings are also conceivable. The electric welding sleeve is welded directly to the connecting component 2 on one side and to the pipeline on the other side. As an alternative example, the connecting component 2 is welded to a connecting piece 7 at the end face on the other side of the length compensator 1, preferably by means of WNF welding or another material-fitting connection technique. This connecting piece 7 is then in turn connected to a coupling 6, again an electric welding sleeve 6 here. This is only an exemplary representation; there are further possible ways in which the connecting components 2 can be connected to the pipeline.

A further alternative embodiment of a length compensator 1 according to the invention is illustrated in FIG. 3. In the illustrated embodiment, the compensating element ends 8 are fastened to the connecting components 2 by means of a form- and force-fitting connection 9, wherein, to this end, a clamp is used in FIG. 3, although other known connection techniques can also be used for this purpose.

FIG. 4 shows a length compensator 1 according to the invention with a compensating element 3 according to the invention. As in the other embodiments in which a simple tube is used as a compensating element, the length compensator 1 has a respective connecting components 2 and 2a at the two compensating element ends 8, which connecting components are connected by material-, form- and/or force fit, as already mentioned. One of the connecting components 2 is preferably fixed securely to the supporting pipe 4 or axially to the supporting pipe 4 so that the length compensator 1 or the connecting component 2a only shifts axially on one side. To delimit the axial expansion, the length compensator 1 has a stop element 11 on the opposite side of the connecting component 2 fixed to the supporting pipe 4.

Figure 5:
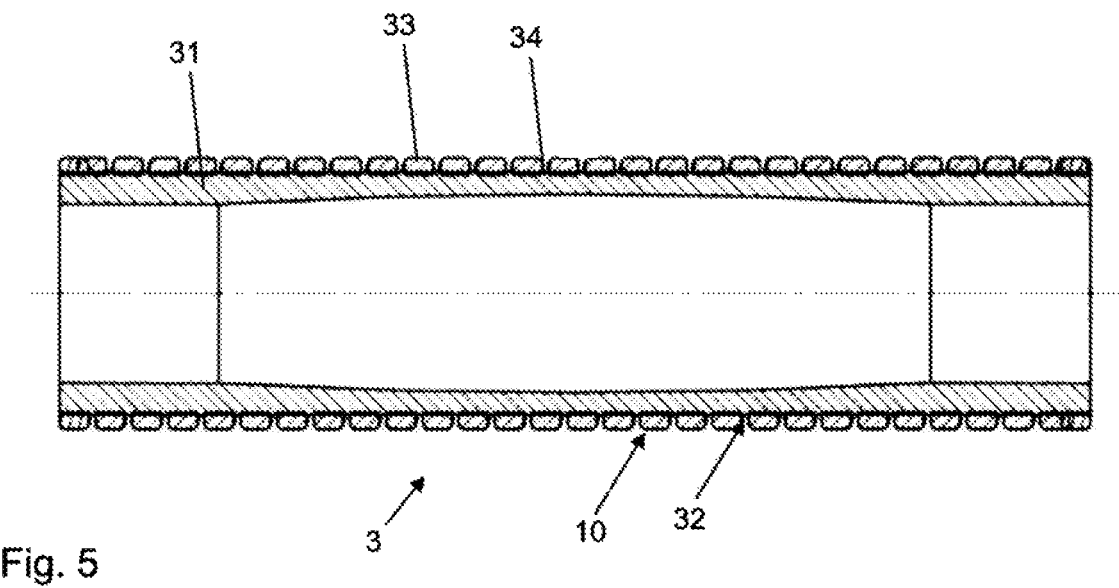
FIG. 5 shows a longitudinal section of a compensating element according to the invention for a length compensator.

The compensating element 3 according to the invention is illustrated separately in FIG. 5. The inner cylindrical hollow body 31 is shown, which is preferably produced from an elastic material, preferably a plastic. Arranged on its outer lateral surface 32 is a helical element 33, which, by means of its outer lateral surface, forms a friction-reducing layer in order to exhibit the least possible resistance with respect to the inner lateral surface of the supporting pipe. The helical element 33 is preferably produced from a plastic. For a defined arrangement on the inner cylindrical hollow body 31, this latter has a profile 34 on its outer lateral surface 32. The helical element 33, which is arranged inside the profile, is thus unable to shift in terms of its arrangement and a uniform expansion of the compensating element 3 is ensured. The profile 34 is preferably formed as a helically extending web along the outer lateral surface 32 of the cylindrical hollow body 31.

The construction of the length compensator described above is perhaps show more clearly in FIG. 4a which illustrates an enlarged portion of FIG. 4. Here, it is shown that the movable connecting component 2a has moved a distance to the right as shown by the arrows in FIG. 4a resulting from a contraction of the compensating element 3. FIG. 4a also more clearly illustrates the relationship between the helical element 33 captured between the profile 34 in the cylindrical body 31. The helical element 33 slides and lubricates the inner wall of the pipe 4 as it moves with the compensating element 3.

The cylindrical hollow body 31 preferably has a wall thickness increase towards the end faces. This ensures a wider distribution of the stress which occurs under tension and ensures that a connection with a greater load-bearing capacity is present between the compensating element or the cylindrical hollow body 31 and the connecting components 2.

Figure 6:
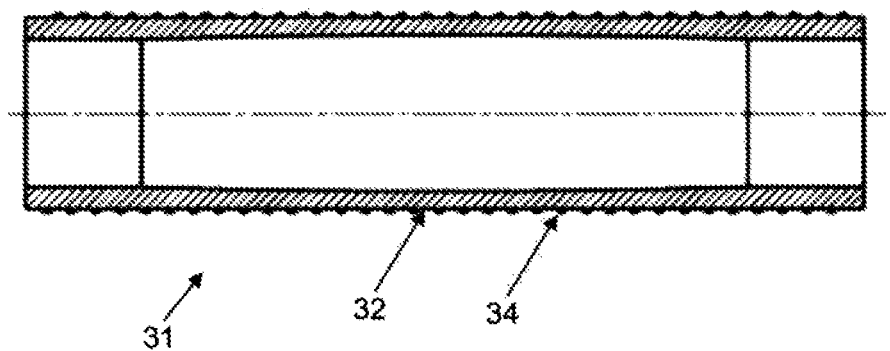
FIG. 6 shows a cylindrical hollow body of a compensating element according to the invention.

The cylindrical hollow body 31 is illustrated separately in FIG. 6.

The compensating element 3 can be produced via separate production of the cylindrical hollow body 31 and separate production of the helical element 33 and a subsequent assembly procedure, whereby the helical element 33 is assembled and screwed on the cylindrical hollow body 31, or via a two-component injection moulding process, whereby the cylindrical hollow body 31 and the helical element 33 are injection moulded together, thereby enabling an assembly process for the two components to be omitted. Production via the two-component injection moulding method can also generate a material fit between the two components in addition to a form- and force-fit.

The invention claimed is:

1. A length compensator for pipelines comprising:
an elastic compensating element in the form of a tube made from a thermoplastic elastomer (TPE),
two connecting components for connecting pipes to ends of the compensating element tube,
a rigid supporting pipe having a straight walled inner surface concentrically surrounding the entire length of a straight walled outer surface of the compensating element tube, the supporting pipe and compensating element tube being configured so that the compensating element tube slides inside the pipe and expands and contracts exclusively in the axial direction to compensate for changes in length of the pipeline, and
wherein the connecting components have the same internal diameter as the compensating element tube, one of the connecting components having an end fixed to one end of the compensating element tube and the other connecting component being fixed to an opposite end of the compensating element tube.

2. A length compensator according to claim 1, wherein the connecting components and the compensating element are connected to one another in a two-component injection moulding process and a respective connecting component is injection moulded to the ends of the compensating element.

3. A length compensator according to claim 1, wherein a friction-reducing layer is arranged on the outer lateral surface of the compensating element.

4. A length compensator according to claim 3, wherein the friction-reducing layer is formed by an anti-friction coating or a metal coating.

5. A length compensator according to claim 3,
wherein the friction-reducing layer is formed by rings or a fabric, and
wherein the friction-reducing layer forms the outer lateral surface of the compensating element.

6. A length compensator according to claim 1,
wherein the length compensator has a stop element, and
wherein the stop element is arranged at an end of the supporting pipe.

7. A length compensator according to claim 1, wherein the supporting pipe is encompassed by an insulation layer.

8. The length compensator of claim 1 wherein the connecting components are fixed to the ends of the compensating element tube by butt welding, or by WNF welding, or sleeve welding, or electric sleeve welding or a bonded connection.

9. A method for producing a length compensator (1) according to claim 1, wherein the compensating element (3) and the connecting components (2) are connected to one another in an injection moulding method or the connecting components (2) are injection moulded onto the compensating element ends (8).

10. A length compensator for pipelines comprising:
an elastic compensating element in the form of a tube made from a thermoplastic elastomer (TPE),
two connecting components for connecting pipes to ends of the compensating element tube,
a rigid supporting pipe having a straight walled inner surface concentrically surrounding the entire length of an outer surface of the compensating element tube, the supporting pipe and compensating element tube being configured so that the compensating element tube slides inside the pipe and expands and contracts exclusively in the axial direction to compensate for changes in length in the pipeline,
a helical element made from plastic arranged on the outer lateral surface of the compensating element tube, the helical element contacting the inner surface of the supporting pipe and being configured to provide a friction reducing layer, and
one of the connecting components being fixed to one end of the pipe adjacent one end of the compensating element tube, while the other connecting component is connected to an opposite end of the compensating element tube so it can shift with the compensating element tube.

11. A length compensator according to claim 10, wherein the outer lateral surface of the compensating element tube has a helically extending web.

12. A length compensator according to claim 11, wherein the helical element is arranged inside the helically extending web on the outer lateral surface of the compensating element tube.

13. The length compensator of claim 10 which further comprises:
a stop extending radially inwardly from an end of the pipe, the stop being configured to limit shifting of said other connecting component.

* * * * *